Dec. 29, 1970 A. PRIETO 3,551,898
COMPUTER MEMORY ADDRESSING
Filed Nov. 1, 1967
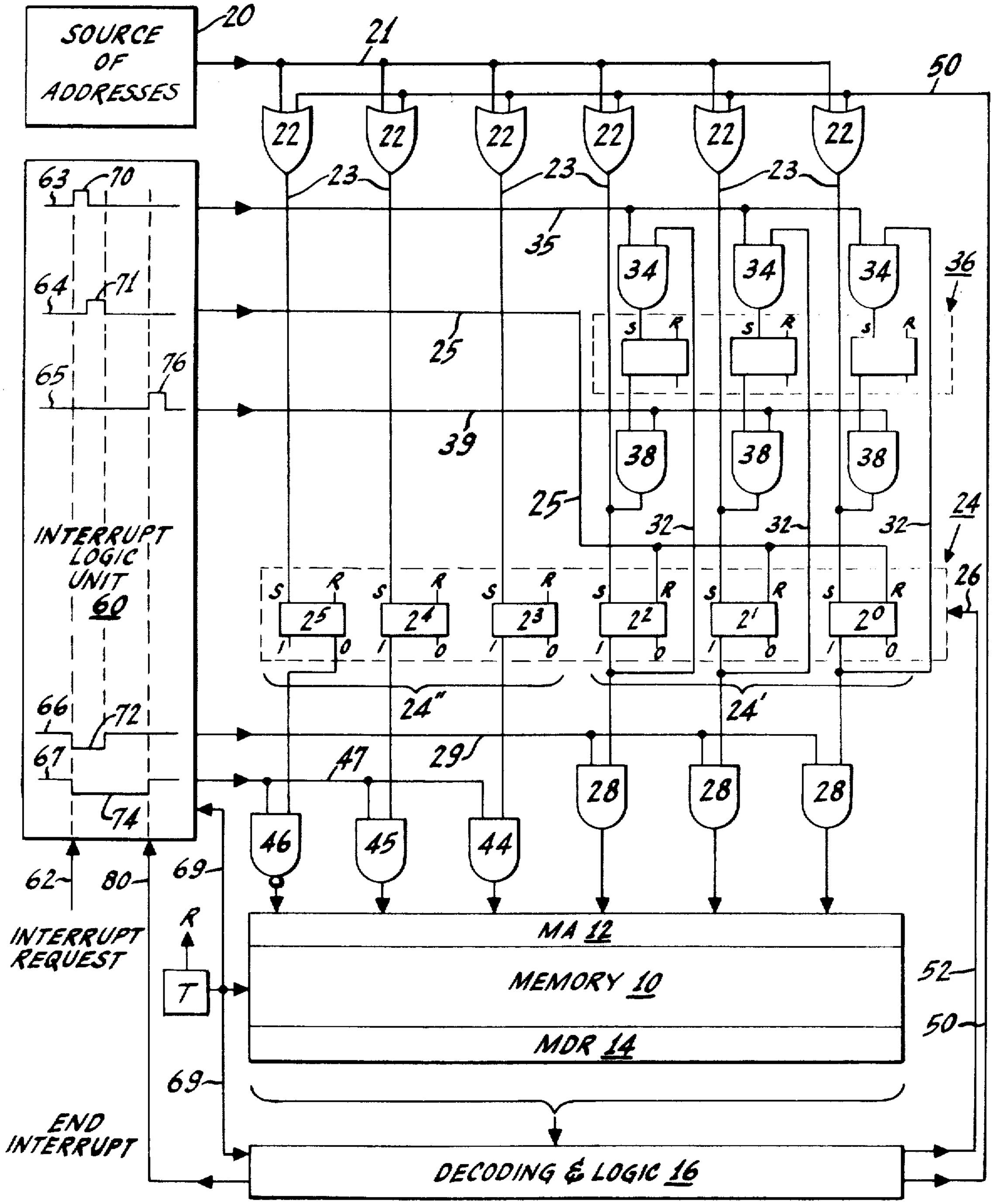
INVENTOR:
ANTHONY PRIETO
BY Carl V. Olson
Attorney 3,551,898

COMPUTER MEMORY ADDRESSING

Anthony Prieto, Palm Beach, Fla., assignor to RCA Corporation, a corporation of Delaware Filed Nov. 1, 1967, Ser. No. 679,703
Int. Cl. G11c *7/00*
U.S. Cl. 340—172.5 6 Claims

ABSTRACT OF THE DISCLOSURE

In a computer, an address register or counter cyclically supplies addresses of instructions through gates to a memory. In the event of an interrupt, such as for an input-output operation, an interrupt control unit transfers the contents of the low order bits portion of the register to an auxiliary register, and supplies a control signal to the gates to generate high order bits, which together with "0" low order bits, constitutes a predetermined address containing the first instruction of an interrupt subroutine. At the end of the interrupt, the contents of the high order bits portion of the register, and the low order bits returned from the auxiliary register, are supplied to the memory. The switching between main program and interrupt subroutine is accomplished without loss of a memory cycle.

BACKGROUND OF THE INVENTION

In the operation of a computer, an address register or counter supplies addresses to a memory to retrieve stored information in a sequence determined by the program. If it is necesary to interrupt the program to service an input-output device, the address of the next instruction of the program is stored for future use, and the address of the first instruction of an interrupt subroutine is supplied to the memory. At the end of the interrupt subroutine, the address of the next instruction of the program is returned to the address register.

The described procedure, followed at the beginning and end of an interrupt routine, requires a large amount of hardware for the temporary storage and timely gating of the address of the next instruction of the main program, particularly when the switching between main program and interrupt subroutine is to be accomplished between successive memory cycles. It is therefore an object of this invention to provide an improved memory addressing system employing a reduced amount of hardware and operating to permit an interruption after any instruction of the main program, the performance of the interrupt routine starting with the very next memory cycle, and a return to the next instruction of the main program, again without the loss of a memory cycle.

SUMMARY OF THE INVENTION

The invention may be applied to a computer having a memory for data and instructions, including the first instruction to be performed in the event of an interrupt, the first instruction having a predetermined address consisting of high order bits in a pattern of "1's" and "0's" and low order bits which are all "0's." An address register or address counter includes a plurality of bit-storage flip-flops each having "1" and "0" outputs, the register being partitioned into high order flip-flops and low order flip-flops. A plurality of high order gates are normally operative to transfer the contents of the high order flip-flops to the memory, some of the high order gates being "and" gates each having an input coupled to the "1"

output of a respective high order flip-flop, and others of the high order gates being inverting "and" gates ("nand" gates) each having an input coupled to the "0" output of a respective high order flip-flop. A plurality of low order gates are normally operative to transfer the contents of the low order flip-flops to the memory. An interrupt logic unit is responsive to an interrupt request to transfer the contents of the low order flip-flops to an auxiliary low order register, to inhibit the transfer of the contents of the high order flip-flops through the high order "and" gates, and to generate "1's" at the outputs of the high order "nand" gates. Also, the interrupt logic unit is responsive to an end-of-interrupt signal to return the contents of the auxiliary low order register to the low order flip-flops.

BRIEF DESCRIPTION OF THE DRAWING

The sole figure of the drawing is a diagram of a memory addressing system constructed according to the teachings of the invention.

DETAILED DESCRIPTION

Referring now in greater detail to the drawing, there is shown a random-access memory 10 including a memory address receiving unit 12 and an information-supplying data register 14. The memory 10 may be a read-only memory. The memory address receiving unit 12 may include an address register, an address decoder and drive circuitry for energizing a memory location specified by a received address. The addressed information read out from the memory 10 to the data register 14 is supplied to a decoding and logic unit 16 constructed to utilize information read out from the memory.

A source 20 of addresses for the memory 10 may be constituted by the basic processing unit of a computer of which the memory addressing system shown in the drawing is a part. Addresses from the source 20 are coupled over a multi-conductor line 21 through "or" gates 22 and respective lines 23 to respective inputs of an address register or address counter 24. The address register 24 includes a number of flip-flops equal to the number of binary information bits required for addressing any particular word storage location in the memory 10. The address register 24 shown by way of example in the drawing includes six flip-flops for six bits of a six-bit memory address. The address register 24 is partitioned into a low order bit portion 24' for binary bits $2^0$, $2^1$, $2^2$, and an high order bit portion 24'' including flip-flops for binary bits $2^3$, $2^4$, $2^5$. The low order bit flip-flops may be reset by a signal applied over lines 25 to their reset inputs R. The address register or address counter 24 is constructed in a conventional manner to count in response to an increment command pulse applied to the increment input 26 of the counter 24.

The "1" outputs of the low order flip-flops 24' are coupled through low order "and" gates 28 to the memory address receiving unit 12. The "and" gates 28 are normally enabled by a signal supplied to their control inputs on line 29. The outputs of the low order flip-flops 24' are also coupled over respective lines 32 and through respective "and" gates 34 to the set inputs S of respective flip-flops in an auxiliary register 36. The "and" gates 34 are normally disabled by an inhibiting signal on line 35. The outputs of the flip-flops in the auxiliary register 36 are coupled through respective "and" gates 38 to set inputs S of respective low order flip-flops in the low order bit portion 24' of the address register or address counter 24. The "and" gates 38 are normally disabled by an inhibiting signal on line 39.

The outputs of the high order bit flip-flops in the high order bits portion 24″ of the register or counter 24 are coupled through respective gates 44, 45 and 46 to the memory address register 12. The gates 44 and 45 are "and" gates each having an input connected to the "1" output of a respective high order bit flip-flop. The gate 46 is a "nand" gate having an input coupled to the "0" output of the respective high order bit flip-flop $2^5$. All of gates 44, 45 and 46 are supplied with an input control signal over line 47 which normally enables the "and" gates 44 and 45.

Since the control signal on line 47 normally is a binary "1," the contents of the $2^5$ flip-flop is normally reproduced at the output of the "nand" gate 46. This is so because it is the "0" output of the $2^5$ flip-flop which is coupled to the input of gate 46 and which appears in inverted form at the output of the gate 46. That is, if the $2^5$ flip-flop contains a "1," the "0" at the "0" output of the flip-flop is inverted by the "nand" gate to produce a "1" at its output. On the other hand, if the $2^5$ flip-flop contains a "0," the "1" at the "0" output of the flip-flop is inverted by the "nand" gate 46 to produce a "0" at its output.

The use of "nand" gates connected in the manner of gate 46, and the use of "and" gates connected in the manner of gates 44 and 45, in relation to the respective high order bit flip-flops 24″, and the use of "and" gates 28 in relation to respective low order bit flip-flops 24′, is prearranged in accordance with an assignment of memory locations in the memory 10. The gates and connections illustrated in FIG. 1 follow from an assignment of the memory location having the address 100000 as the location of the first instruction of an interrupt subroutine. For each high order address bit that is a "1," a "nand" gate is employed with its input coupled to the "0" output of the respective high order flip-flop. For each high order address bit that is a "0," an "and" gate is employed with its input coupled to the "1" output of the respective high order flip-flop. For each of the low order address bits, an "and" gate is employed with its input coupled to the "1" output of the respective low order flip-flop. The number of low order bits employed is predetermined at a value large enough to form as many memory addresses as are needed in the performance of the interrupt subroutine.

As has been described, a memory address may be loaded into the address register or counter 24 from a source 20 of addresses. An address may also be loaded into the address counter 24 from the decoding and logic unit 16, over a multiconductor line 50, through "or" gates 22 and over lines 23 to set inputs S of the flip-flops in counter 24. The address supplied from the decoding and logic unit 16 may be a complete address, or may be merely the low order bits of an address. The address contained in the address register or counter 24 may be incremented by an incrementing command signal supplied from the decoding and logic unit 16 over line 52 to the incrementing input 26 of the counter 24. Conventional known constructions may be employed to permit multiple incrementing and decrementing of the counter 24.

An interrupt logic unit 60 is provided for controlling the flow of addresses in the system at the beginning, during, and at the end of an interrupt subroutine. The interrupt logic unit 60 is constructed in a conventional known manner to respond to an interrupt request signal applied to its interrupt request input terminal 62. An interrupt request signal is supplied by an external apparatus (not shown) such as an input-output unit. The interrupt logic unit 60 normally supplies a disabling signal 63 over line 35 to the control inputs of "and" gates 34, normally supplies a disabling signal 64 over line 25 to the reset inputs R of the low order flip-flops 24′ in the counter 24, normally supplies a disabling input 65 over line 39 to the "and" gates 38, normally supplies an enabling signal 66 over line 29 to the low order "and" gates 28, and normally supplies an enabling or control signal 67 over line 47 to the high order gates 44, 45 and 46. The operation of the interrupt logic unit 60, the memory 10, and the decoding and logic unit 16 is synchronized in a conventional manner by means of a timer T and timing interconnections 69. The timer T also supplies general reset pulses R to flip-flops according to conventional known practices.

The interrupt logic unit 60 operates in response to an interrupt request at input 62 to generate a pulse 70 which acts over line 35 to enable all of gates 34 to effect the transfer of the contents of the low order portion 24′ of address counter 24 to the low order auxiliary register 36. The low order flip-flops are thereafter reset by a pulse 71 applied over line 25.

The interrupt logic unit 60 also responds to the interrupt request to generate a pulse 72 which is applied over line 29 to disable all of the low order bit "and" gates 28. Also, beginning at the same time, the interrupt logic unit 60 generates a continuing signal 74 which is applied over line 47 to the inputs of high order bit gates 44, 45 and 46. The continuing signal 74 has a polarity corresponding with "0" information so that its effect on "nand" gate 46 is to generate a "1" information bit at the output of gate 46. The continuing signal 74 applied to high order "and" gates 44 and 45 has a polarity to inhibit the gates and insure "0" information signal at the outputs of the gates.

The interrupt logic unit 60 has an input 80 to which an "end interrupt" signal is supplied from the decoder and logic unit 16. The interrupt logic unit 60 responds to "end interrupt" signal by generating a pulse 76 which is applied over line 39 to enable "and" gates 38. This causes the return of the contents of the auxiliary register 36 to the low order bits portion 24′ of the address counter 24. At the same time, the "end interrupt" signal causes the interrupt logic unit 60 to discontinue the signal 74 which was applied to the high order bit gates 44, 45 and 46. These gates are thereby returned to their normal conditions in which the contents of the high order bits portion 24″ of the counter 24 are supplied to the memory 10.

The assignments herein of "1" and "0" names to binary conditions is of course arbitrary and is done merely for convenience and clarity of description.

OPERATION

In the operation of the memory address system, an initial address from the source 20 is applied through the "or" gates 22 to the set inputs S of the flip-flops in address register or counter 24. The address in counter 24 is applied through normally-enabled gates 28, 44, 45 and 46 to the memory 10. The memory 10 utilizes the address supplied to it to access a corresponding memory location and supplies contents thereof through data register 14 to the decoding and logic unit 16. The information read from the memory 10 to the unit 16 may include the address of the next following memory location to be accessed. In this case, the next address is supplied over multi-conductor line 50 and throgh "or" gates 22 to the address counter 24. On the other hand, the information read from the memory 10 to the unit 16 may result in an incrementing signal from unit 16 over line 52 to the incrementing input 26 of the counter 24. In this case, the count in the counter 24 is incremented and thereafter used for addressing the next memory location in memory 10. The successive cyclical addressing of memory locations continues in the usual manner until an interrupt is requested.

When an interrupt request is applied to the input 62 of interrupt logic unit 60, the unit 60 generates a pulse 70 prior to the time of the next memory cycle which is applied over line 35 to enable "and" gates 34 and accomplish a transfer to the auxiliary register 36 of the contents of the low order bit portion 24' of the counter 24. Immediately thereafter the interrupt logic unit 60 generates a reset pulse 71 which is applied over the line 25 to the reset inputs R of the low order bit flip-flops 24'. The interrupt logic unit 60 also acts at the time of an interrupt request to generate a disabling pulse 72 applied over line 29 to disable "and" gates 28. The condition in the addressing system as thus far described is that the low order bits of the interrupted main program have been stored for future use in the auxiliary register 36, and the low order "and" gates 28 have been disabled so that they supply "0's" to the address input of memory 10.

The high order address bits of the interrupted main program remain in the high order bit flip-flops 24''. However, the contents of the high order bit flip-flops are prevented from being applied through gates 44, 45 and 46 to the memory 10. The interrupt logic unit 60 supplies a continuing signal 74 over line 47 in a polarity to disabled "and" gates 44 and 45. Therefore, the outputs of gates 44 and 45 supply "0" high order address bits to the memory 10. The continuing signal 74 applied to the "nand" gate 46 appears at the output of gate 46 as a "1" address bit which is supplied in a continuing manner during the interrupt to the memory 10. Thus, the signal 74 from the interrupt logic unit 60 forces the application to the memory of high order bits in the pattern 100 regardless of the contents of the high order bits portion 24'' of the counter 24.

The complete address now supplied to the memory consists of high order bits 100 and low order bits 000. The system, of course, can be constructed to utilize any other predetermined number and combination of "0" and "1" bits as the high order address bits. This address is prearranged to be the address of the first instruction to be accessed in the memory 10 after an interrupt request has been made. The first instruction thus addressed in memory 10 is read out to the decoding and logic unit 16 for appropriate utilization. The instruction read out may contain the low order bits of the next following instruction to be executed. If this is the case, the low order bits are transferred from the unit 16 over line 50 and through "or" gates 22 to the low order portion 24' of the counter 24. On the other hand, the address of the next instruction of the interrupt subroutine may be generated by merely supplying an incrementing pulse from the unit 16 to the increment input 26 of counter 24.

The memory addressing system continues in a cyclical manner to sequentially access all the instructions needed to perform the interrupt subroutine. When the last instruction of the interrupt subroutine is reached, it is recognized as such in the decoder and logic unit 16, which thereupon supplies an "end interrupt" signal over the line 80 to the interrupt logic unit 60. The unit 60 responds by generating a pulse 76 which enables "and" gates 38 to return the contents of the auxiliary register 36 to the low order bits portion 24' of the address counter, from which they are passed by enabled gates 28 to the memory. At the same time, the continuing signal 74 is discontinued to permit the contents of the high order bits portion 24'' of the counter to pass through gates 44, 45 and 46 to the memory 10. In this way, following a completion of the interrupt subroutine, the next following address of the previously interrupted main program is presented to the memory 10 for use during the very next cycle of operation of the memory.

What is claimed is:

1. The combination of a register including a plurality of bit-storage flip-flops each having "1" and "0" output terminals, a plurality of gates having a signal input, a control input, and an output connection to utilization means, some of said gates being of a first type and having the signal inputs thereof coupled to "1" output terminals of corresponding ones of said flip-flops, and others of said gates being of a second type and having the signal inputs thereof coupled to "0" output terminals of corresponding ones of said flip-flops, and means to normally apply a control signal to the control inputs of all of said gates having a binary value to effect the transfer of information bits stored in said register to the utilization means, and to apply a control signal to the control inputs of all of said gates having a binary value to inhibit the transfer of information bits through said gates of the first type and to generate "1's" at the outputs of said gates of the second type.

2. The combination of a register including a plurality of bit-storage flip-flops each having "1" and "0" output terminals, a plurality of gates each having a signal input, a control input, and an output for connection to utilization means, some of said gates being "and" gates each having a signal input coupled to the "1" output terminal of a respective flip-flop, and other of said gates being "nand" gates each having a signal input coupled to the "0" output terminal of a respective flip-flop, and means to normally apply a "1" control signal to the control inputs of all of said gates to effect the transfer of information bits stored in said register to the utilization means, and to apply a "0" control signal to the control inputs of all of said gates to inhibit the transfer of information bits through said "and" gates and to generate "1's" at the outputs of said "nand" gates.

3. The combination of a register including a plurality of bit-storage flip-flops each having "1" and "0" outputs terminals, said register being partitioned into high order flip-flops and low order flip-flops, a plurality of high order gates normally operative to transfer the contents of said high order flip-flops to a utilization device, some of said high order gates being of a first type and others of said high order gates being of a second type, a plurality of low order gates normally operative to transfer the contents of said low order flip-flops to said utilization device, an auxiliary low order register, and an interrupt logic unit responsive to an interrupt request to transfer the contents of said low order flip-flops to said auxiliary low order register, to inhibit the transfer of the contents of said high order flip-flops through said gates of the first type and to generate "1's" at the outputs of said gates of the second type.

4. The combination as defined in claim 3 wherein said interrupt logic unit is also responsive to an end-of-interrupt signal to return the contents of said auxiliary low order register to said low order flip-flops.

5. The combination as defined in claim 3 wherein said gates of the first type are "and" gates having an input coupled to the "1" output terminal of a respective flip-flop and said gates of the second type are "nand" gates having an input coupled to the "0" output terminal of a respective flip-flop.

6. In a computer having a memory for data and instructions, including the first instruction to be performed in the event of an interrupt, said first instruction having a predetermined address consisting of high order bits in a pattern of "1's" and "0's" and low order bits which are all "0's", the combination of an address register including a plurality of bit-storage flip-flops each having "1" and "0" output terminals, said register being partitioned into high order flip-flops and low order flip-flops, a plurality of high order gates normally operative to transfer the contents of said high order flip-flops to said memory, some of said high order gates being "and" gates each having an input terminal coupled to the "1" output of a respective high order flip-flop and others of said high order gates being "nand"

gates each having an input coupled to the "0" output of a respective high order flip-flop, a plurality of low order gates normally operative to transfer the contents of said low order flip-flops to said memory, an auxiliary low order register, and an interrupt logic unit responsive to an interrupt request to transfer the contents of said low order flip-flops to said auxiliary low order register, to inhibit the transfer of the contents of said high order flip-flops through said high order "and" gates and to generate "1's" at the outputs of said high order "nand" gates, said interrupt logic unit being responsive to an end-of-interrupt signal to return the contents of said auxiliary low order register to said low order flip-flops.

References Cited

UNITED STATES PATENTS

| | | | |
|---|---|---|---|
| 3,427,595 | 2/1969 | Groth, Jr. | 340—172.5 |
| 3,441,914 | 4/1969 | Bray | 340—172.5 |
| 3,447,136 | 5/1969 | Bogert et al | 340—172.5 |

PAUL J. HENON, Primary Examiner

F. R. WOODS, Assistant Examiner